(12) United States Patent
Hsieh (10) Patent No.: US 12,392,987 B2
(45) Date of Patent: Aug. 19, 2025

(54) HEAD-MOUNTED DISPLAY DEVICE AND ADJUSTMENT MODULE

(71) Applicant: HTC Corporation, Taoyuan (TW)

(72) Inventor: Chih-Hsiang Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 489 days.

(21) Appl. No.: 17/985,153

(22) Filed: Nov. 11, 2022

(65) Prior Publication Data
US 2024/0159985 A1    May 16, 2024

(51) Int. Cl.
*G02B 7/09*    (2021.01)
(52) U.S. Cl.
CPC ..................... *G02B 7/09* (2013.01)
(58) Field of Classification Search
CPC .............. G02B 7/09; G02B 2027/0178; G02B 27/0176
See application file for complete search history.

(56) References Cited

U.S. PATENT DOCUMENTS

| 7,652,828 | B2 | 1/2010 | Perreault |
| 8,077,411 | B2 | 12/2011 | Shyu et al. |
| 2011/0102920 | A1* | 5/2011 | Shyu ......................... G02B 7/08 359/823 |

(Continued)

FOREIGN PATENT DOCUMENTS

| CN | 114270228 | 4/2022 |
| TW | I751786 | 1/2022 |

OTHER PUBLICATIONS

"Notice of allowance of Taiwan Counterpart Application", issued on Nov. 24, 2023, p. 1-p. 4.

*Primary Examiner* — Angela M. Medich
(74) *Attorney, Agent, or Firm* — JCIPRNET (57) ABSTRACT

A head-mounted display device and an adjustment module are provided. The head-mounted display device includes a body and two adjustment modules. The two adjustment modules are configured to be assembled to two zoom lens groups of the body. Each of the adjustment modules includes a base, a sliding block, a first shape memory alloy (SMA) element, a first recovery element, a braking element, a second SMA element, and a second recovery element. The first SMA element is connected between the base and an actuating end of the sliding block and is configured to actuate the sliding block so that a transmission end of the sliding block drives the zoom lens group to zoom. The first recovery element is connected between the base and the actuating end and is configured to keep the sliding block at an original position when the first SMA element is in a power-off state. The braking element is engaged with a braking end of the sliding block when the braking element is in a braking position. The braking element is separated from the braking end when the braking element is in a movable position. The second SMA element is connected between the base and the braking element and is configured to actuate the braking element to move between the braking position and the movable position. The second recovery element is connected between the base and the braking element and is configured to keep the braking element at the braking position or the movable position when the second SMA element is in the power-off state.

16 Claims, 5 Drawing Sheets

(56) References Cited

U.S. PATENT DOCUMENTS

2019/0346682 A1 11/2019 Kang et al.
2020/0285310 A1 9/2020 Sazuka et al.
2023/0140724 A1* 5/2023 Kondo .................... G03B 5/00
                                                          359/827

* cited by examiner

HEAD-MOUNTED DISPLAY DEVICE AND ADJUSTMENT MODULE

BACKGROUND

Technical Field

The invention relates to a head-mounted display device and an adjustment module, and in particular, relates to a head-mounted display device capable of auto-zooming and an adjustment module.

Description of Related Art

At present, with the rapid advancement of technology, the types and functions of head-mounted display devices are increasingly diversified. Taking a head-mounted display device of the eye mask type as an example, when a user wears this type of device, the gyroscope and position tracker inside the head-mounted display device will track the user's movement status to project corresponding scene images, providing the user with an experience as if he/she is in a virtual world.

When using the head-mounted display device, since each user has a different degree of myopia, two zoom lens groups can be provided in the head-mounted display device to suit different users, so that each user can enjoy the best experience. In a head-mounted display device currently available in the market, the zoom lens groups are mainly zoomed manually. However, a user may not be able to obtain the best zooming effect through manual operation.

SUMMARY

The invention provides a head-mounted display device and an adjustment module capable of providing a motorized zooming function.

The invention provides a head-mounted display device including a body and two adjustment modules. The body has two zoom lens groups corresponding to both eyes. The two adjustment modules are configured to be assembled to the two zoom lens groups. Each of the adjustment modules includes a base, a sliding block, a first shape memory alloy (SMA) element, a first recovery element, a braking element, a second SMA element, and a second recovery element. The sliding block has an actuating end, a braking end, and a transmission end. The first SMA element is connected between the base and the actuating end and is configured to actuate the sliding block so that the transmission end drives the corresponding zoom lens group to zoom. The first recovery element is connected between the base and the actuating end and is configured to keep the sliding block at an original position when the first SMA element is in a power-off state. The braking element is engaged with the braking end when the braking element is in a braking position. The braking element is separated from the braking end when the braking element is in a movable position. The second SMA element is connected between the base and the braking element and is configured to actuate the braking element to move between the braking position and the movable position. The second recovery element is connected between the base and the braking element and is configured to keep the braking position or the movable position when the second SMA element is in the power-off state.

The invention further provides an adjustment module configured to be assembled to a zoom lens group of the head-mounted display device. The adjustment module includes a base, a sliding block, a first shape memory alloy (SMA) element, a first recovery element, a braking element, a second SMA element, and a second recovery element. The sliding block has an actuating end, a braking end, and a transmission end. The first SMA element is connected between the base and the actuating end and is configured to actuate the sliding block so that the transmission end drives the zoom lens group to zoom. The first recovery element is connected between the base and the actuating end and is configured to keep the sliding block at an original position when the first SMA element is in a power-off state. The braking element is engaged with the braking end when the braking element is in a braking position. The braking element is separated from the braking end when the braking element is in a movable position. The second SMA element is connected between the base and the braking element and is configured to actuate the braking element to move between the braking position and the movable position. The second recovery element is connected between the base and the braking element and is configured to keep the braking element at the braking position or the movable position when the second SMA element is in the power-off state.

To sum up, in the head-mounted display device and the adjustment module provided by the invention, the first SMA element can drive the zoom lens group to zoom, the second SMA element can drive the braking element to allow zooming or prohibit zooming, and motorized zooming is thereby achieved.

DESCRIPTION OF THE EMBODIMENTS

Figure 1:
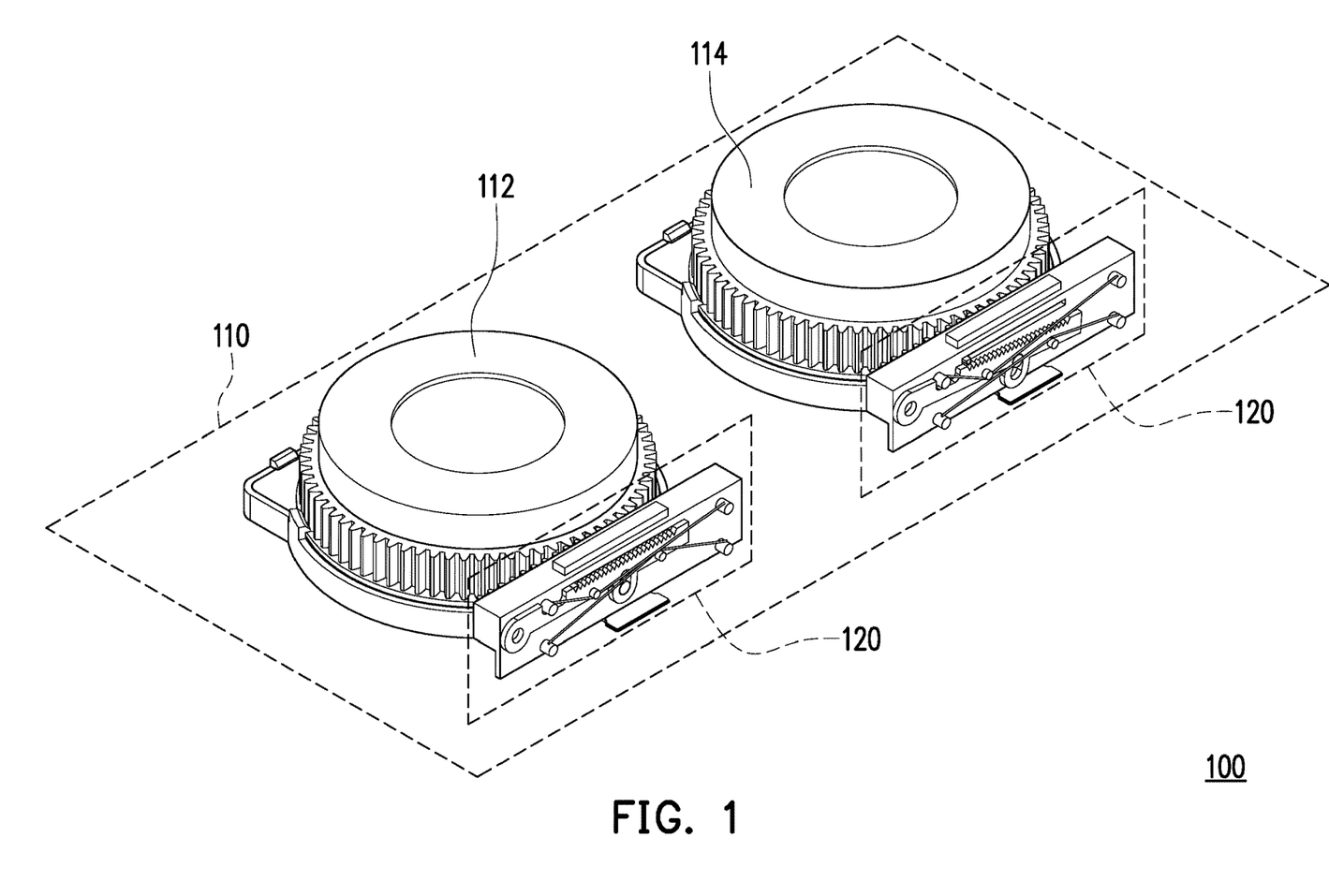
FIG. 1 is a schematic view of a head-mounted display device according to an embodiment of the invention.

FIG. 1 is a schematic view of a head-mounted display device according to an embodiment of the invention. With reference to FIG. 1, a head-mounted display device 100 provided by this embodiment includes a body 110 and two adjustment modules 120. The body 110 has a zoom lens group 112 and a zoom lens group 114 corresponding to both eyes. The two adjustment modules 120 are configured to be assembled to the zoom lens group 112 and the zoom lens group 114. That is, one adjustment module 120 is assembled to the zoom lens group 112, and the other adjustment module 120 is assembled to the zoom lens group 114. The zoom lens group 112 and the zoom lens group 114 can perform zooming individually and independently.

Figure 2:
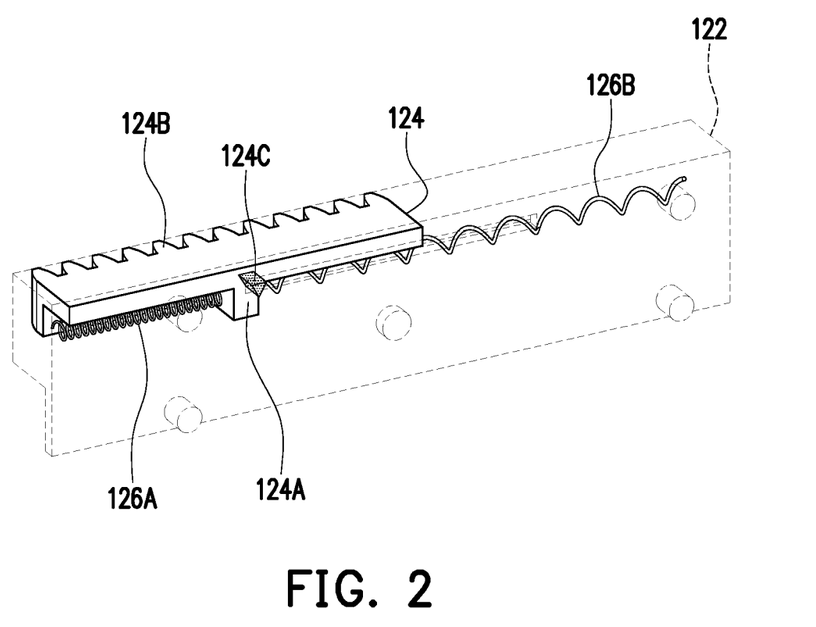
FIG. 2 is a schematic view of some elements of an adjustment module of the head-mounted display device of FIG. 1.
Figure 3:
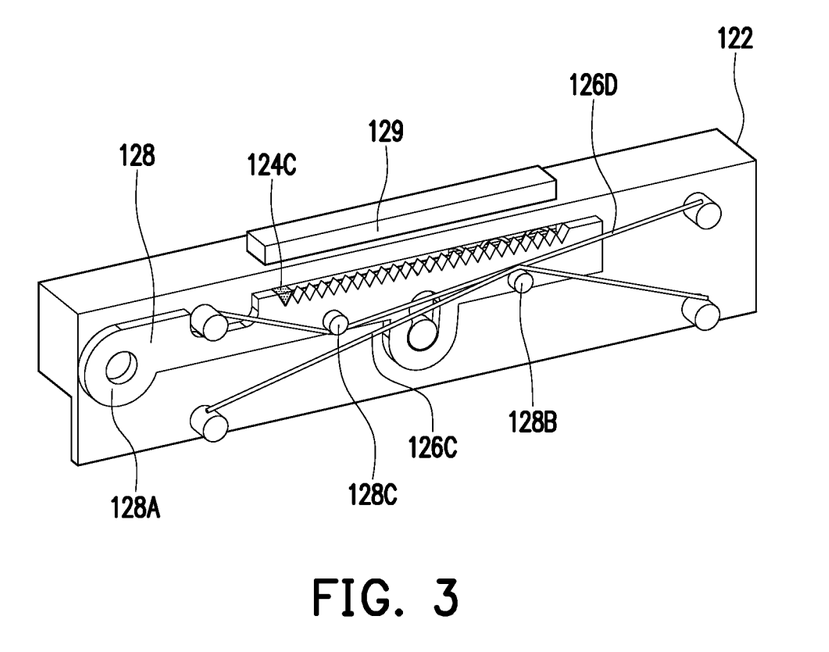
FIG. 3 is a schematic view of some other elements of the adjustment module of the head-mounted display device of FIG. 1.

FIG. 2 is a schematic view of some elements of the adjustment module 120 of the head-mounted display device 100 of FIG. 1. FIG. 3 is a schematic view of some other elements of the adjustment module 120 of the head-mounted display device 100 of FIG. 1. With reference to FIG. 2 and FIG. 3, in this embodiment, each of the adjustment modules 120 includes a base 122, a sliding block 124, a shape memory alloy (SMA) element 126A, a first recovery element 126B, a braking element 128, a second SMA element 126C, and a second recovery element 126D. In FIG. 2, the elements located in front of the base 122 are omitted, and the base 122 is shown in a see-through state to clearly show the elements behind the base 122. In FIG. 3, the base 122 is shown in a non-see-through state, so that the elements behind the base 122 cannot be seen.

With reference to FIG. 1 and FIG. 2, the sliding block 124 has an actuating end 124A, a braking end 124C, and a transmission end 124B. The first SMA element 126A is connected between the base 122 and the actuating end 124A and is configured to actuate the sliding block 124 so that the transmission end 124B drives the corresponding zoom lens group 112 or the zoom lens group 114 to zoom. The temperature of the first SMA element 126A may increase by electrifying it, and a length of the first SMA element 126A may also change accordingly, thus driving the sliding block 124 to move. The first recovery element 126B is connected between the base 122 and the actuating end 124A and is configured to keep the sliding block 124 at an original position when the first SMA element 126A is in a power-off state. Herein, the specific position of the original position is not limited. As long as the first SMA element 126A is in the power-off state, the sliding block 124 is forced by the first SMA element 126A and the first recovery element 126B simultaneously to reach the force balance position, it is the original position. The original position may be affected and change by various parameters such as materials and sizes of the first recovery element 126B and the first SMA element 126A. Besides, keeping the sliding block 124 at the original position by the first recovery element 126B means that the sliding block 124 has a tendency to move towards the original position and stop at the original position. However, if it is affected by other external forces, such as the action of an actuating element to be mentioned in the following paragraphs, the sliding block 124 may not reach the original position.

With reference to FIG. 1 and FIG. 3, the braking element 128 is engaged with the braking end 124C when the braking element 128 is in a braking position. The braking element 128 in FIG. 3 is at the braking position and is engaged with the braking end 124C. The braking element 128 is separated from the braking end 124C when it is in a movable position, such as the positions of the braking element 128 in FIG. 7 and FIG. 9. In fact, as long as the braking element 128 is separated from the braking end 124C, it is a movable position. The second SMA element 126C is connected between the base 122 and the braking element 128 and is configured to actuate the braking element 128 to move between the braking position and the movable position. The second recovery element 126D is connected between the base 122 and the braking element 128 and is configured to keep the braking element 128 at the braking position or the movable position when the second SMA element 126C is in the power-off state.

For instance, in this embodiment, the second SMA element 126C may contract after being electrified and heated, so that the actuated braking element 128 is located at the movable position, and the second recovery element 126D may keep the braking element 128 at the braking position when the second SMA element 126C is in the power-off state. Keeping the braking element 128 at the braking position by the second recovery element 126D means that the braking element 128 has a tendency to move towards the braking position and stop at the braking position. However, if it is affected by other external forces, the braking element 128 may not reach the movable position.

In the head-mounted display device and the adjustment modules provided by this embodiment, the zoom lens group 112 and the zoom lens group 114 may individually and independently perform zooming via the matching adjustment modules 120. Therefore, if a user is short-sighted, the zoom lens group 112 and the zoom lens group 114 may be zoomed to obtain clear images. Moreover, even if the degrees of myopia of both eyes of the user are different, the zoom lens group 112 and the zoom lens group 114 may be individually zoomed so that both eyes can obtain clear images. In addition, because the first SMA element 126A is used to drive the sliding block 124 to zoom, the zooming may be performed in a motorized zooming manner, and improved precision is thereby provided. Besides, because the second SMA element 126C is used to drive the braking element 128 to allow zooming or prohibit zooming, both the zoom lens group 112 and the zoom lens group 114 may be kept in a zoom state suitable for the user.

Figure 4:
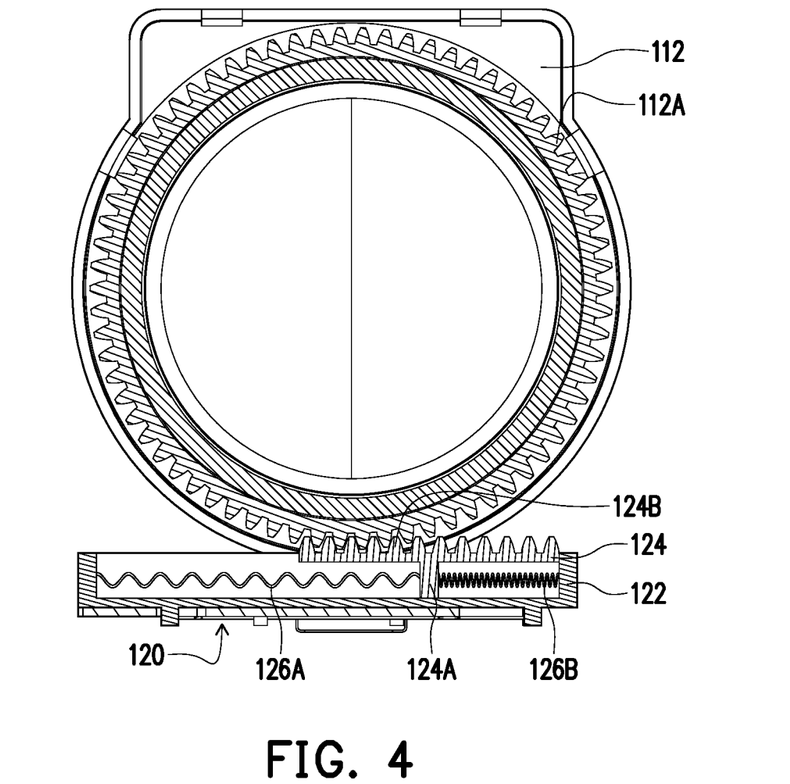
FIG. 4 is a cross-sectional schematic view illustrating operation of the adjustment module and a zoom lens group of the head-mounted display device of FIG. 1.
Figure 5:
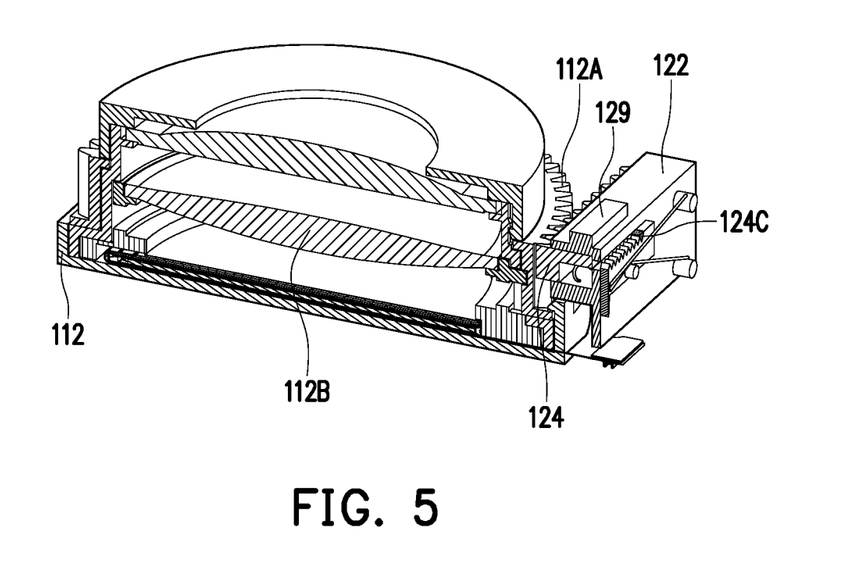
FIG. 5 is a schematic view of another section of FIG. 4.

FIG. 4 is a cross-sectional schematic view illustrating operation of the adjustment module and a zoom lens group of the head-mounted display device of FIG. 1. FIG. 5 is a schematic view of another section of FIG. 4. With reference to FIG. 4 and FIG. 5, in this embodiment, the first SMA element 126A and the first recovery element 126B are located at two opposite sides of the actuating end 124A. Certainly, the first SMA element 126A and the first recovery element 126B may also be connected to the same side of the actuating end 124A or connected to other different orientations, which is not limited in the invention. In this embodiment, the transmission end 124B is in the shape of a rack. Correspondingly, the exterior of a focus ring 112A of the zoom lens group 112 is gear-shaped, so that the transmission end 124B may be engaged with the focus ring 112A of the zoom lens group 112 and rotate the focus ring 112A.

In this embodiment, the first SMA element 126A contracts after being electrified and heated to drive the actuating end 124A. However, in other embodiments, the first SMA element 126A may also be designed to extend after being electrified and heated to push the actuating end 124A.

In the state shown in FIG. 4 and FIG. 5, the braking element 128 is at the braking position and is engaged with the braking end 124C of the sliding block 124. In this way, the sliding block 124 cannot move, and the focus ring 112A of the zoom lens group 112 cannot rotate, so that the position of a lens 112B corresponding to the focus ring 112A is fixed.

Figure 6:
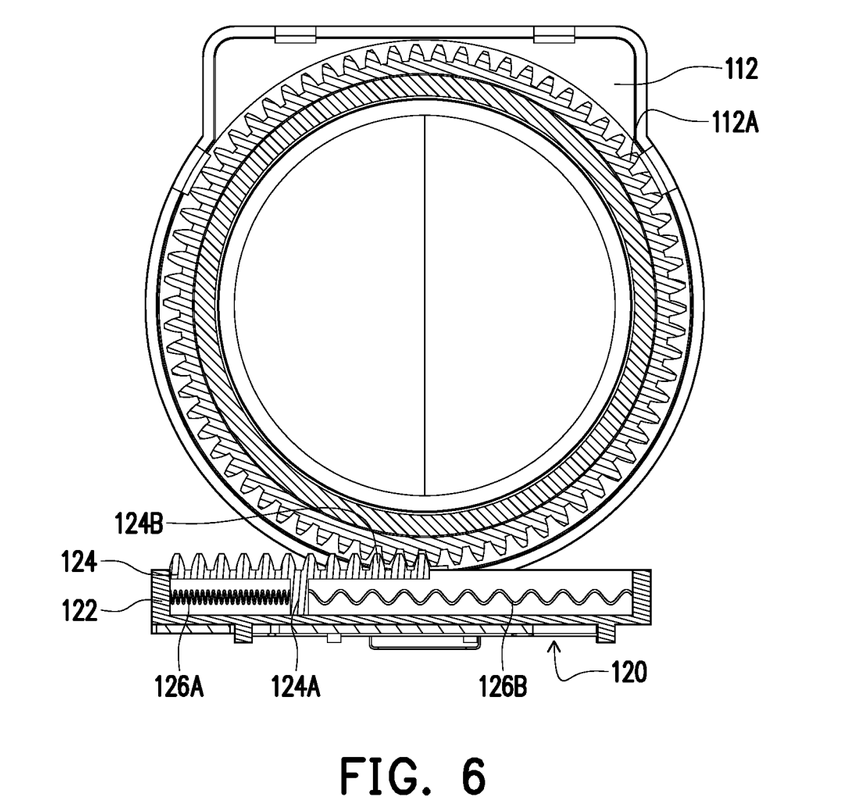
FIG. 6 is another cross-sectional schematic view illustrating operation of the adjustment module and the zoom lens group of the head-mounted display device of FIG. 1.
Figure 7:
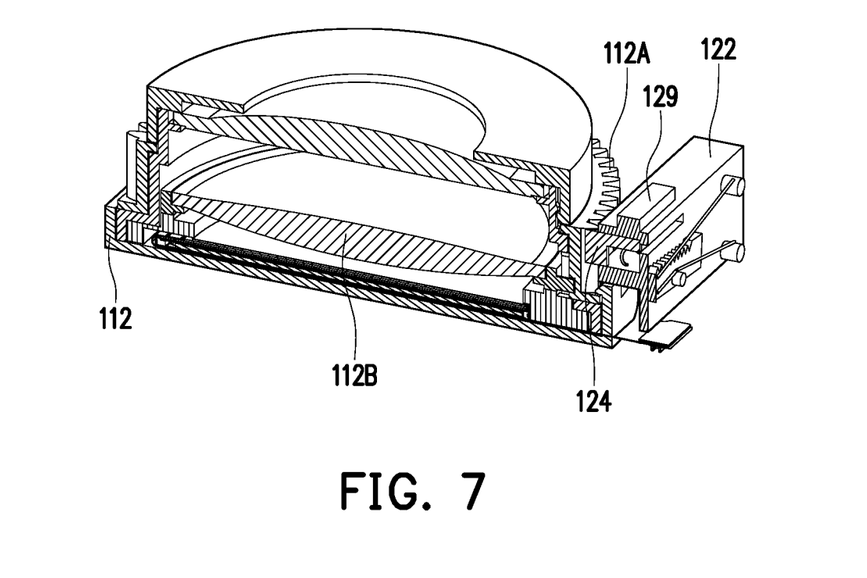
FIG. 7 is a schematic view of another section of FIG. 6.

FIG. 6 is another cross-sectional schematic view illustrating operation of the adjustment module and the zoom lens group of the head-mounted display device of FIG. 1. FIG. 7 is a schematic view of another section of FIG. 6. In the state shown in FIG. 6 and FIG. 7, the braking element 128 is located at the movable position and is separated from the sliding block 124. In this way, the sliding block 124 can move and the focus ring 112A of the zoom lens group 112 can rotate, so that the lens 112B corresponding to the focus ring 112A may be moved, for example, may be moved upwards from the position shown in FIG. 5 to the position shown in FIG. 7. In other embodiments, the sliding block 124 may also drive other lenses in the zoom lens group 112 to achieve the function of zooming.

Figure 8:
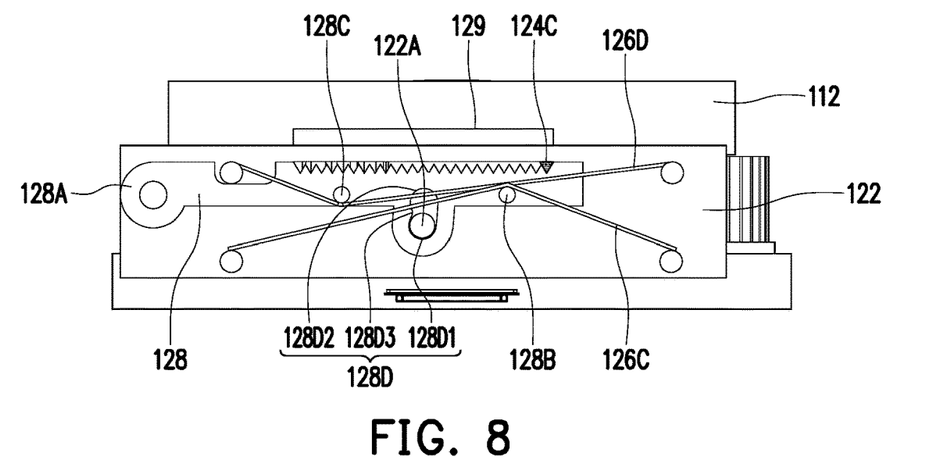
FIG. 8 to FIG. 10 are schematic views of three states of the adjustment module of the head-mounted display device of FIG. 1.
Figure 9:
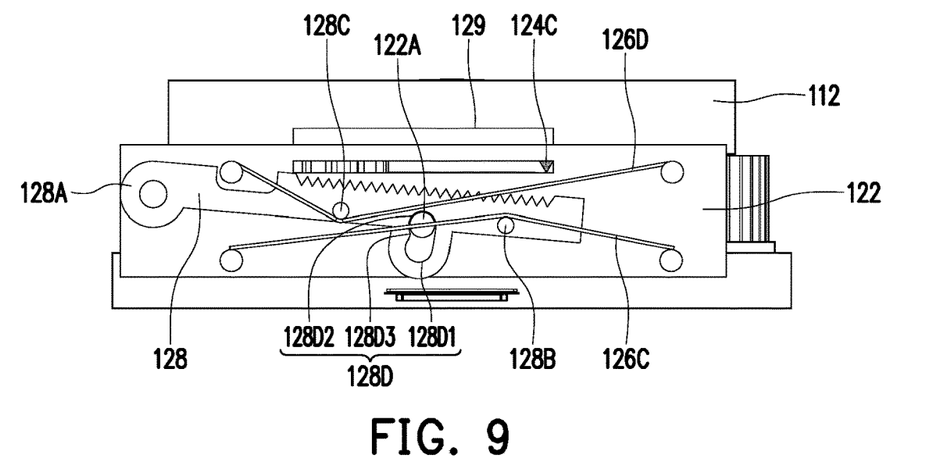
Figure 10:
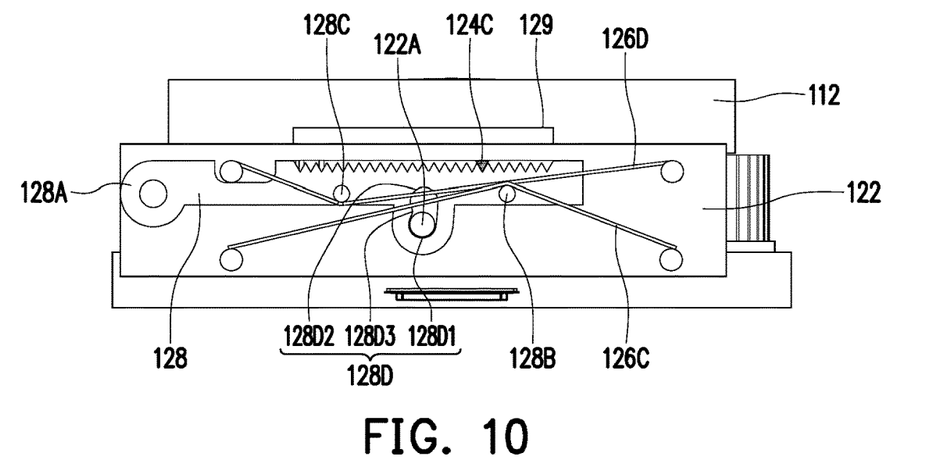

FIG. 8 to FIG. 10 are schematic views of three states of the adjustment module of the head-mounted display device of FIG. 1. With reference to FIG. 8, in this embodiment, the braking element 128 has a pivot end 128A, a first protrusion 128B, and a second protrusion 128C. The braking element 128 is pivotally connected to the base 122 through the pivot end 128A, that is, the braking element 128 can rotate relative to the base 122 with the pivot end 128A as a rotation axis. The second SMA element 126C is connected between the base 122 and the first protrusion 128B. The second recovery element 126D is connected between the base 122 and the second protrusion 128C. In this embodiment, each of the second SMA element 126C and the second recovery element 126D is in the shape of a straight line, and the two bypass the first protrusion 128B and the second protrusion 128C respectively, but the invention is not limited thereto.

Therefore, when the second SMA element 126C contracts after being electrified and heated, the second SMA element 126C may push the first protrusion 128B to make the braking element 128 rotate in one direction, for example, rotate in a direction where it can be separated from the braking end 124C. When the second recovery element 126D contracts after being electrified and heated, the second recovery element 126D may push the second protrusion 128C to make the braking element 128 rotate in another direction, for example, rotate in a direction where it can be engaged with the braking end 124C. In this embodiment, a material of the second recovery element 126D is a SMA, but the invention is not limited thereto. In an embodiment that is not shown, a torsion spring may also be provided at the pivot end 128A to replace or assist the second recovery element 126D to provide torque to the braking element 128, so that it rotates in the opposite direction when it is braked by the second SMA element 126C.

In this embodiment, the base 122 has a protrusion 122A. The braking element 128 further includes a positioning groove 128D. The protrusion 122A is accommodated in the positioning groove 128D, and the protrusion 122A and the positioning groove 128D can move relatively. The positioning groove 128D has a first end 128D1, a second end 128D2, and a neck portion 128D3, and the neck portion 128D3 is located between the first end 128D1 and the second end 128D2. A width of the neck portion 128D3 is slightly less than a width of the protrusion 122A. Therefore, after the protrusion 122A passes through the neck portion 128D3, it can stay stably at the first end 128D1 or the second end 128D2.

With reference to FIG. 5 and FIG. 8, before operating, the braking element 128 is located at the braking position and is engaged with the braking end 124C, so that the sliding block 124 cannot move, and that the position of the lens 112B corresponding to the focus ring 112A of the zoom lens group 112 is fixed. When the braking element 128 is at the braking position, the protrusion 122A is located at the first end 128D1 of the positioning groove 128D. When the protrusion 122A is located at the first end 128D1 of the positioning groove 128D, the neck portion 128D3 may engage the protrusion 122A in the first end 128D1 of the positioning groove 128D, so that the braking element 128 is positioned at the braking position.

With reference to FIG. 7 and FIG. 9, when the user inputs a zoom command, for example, the second SMA element 126C is electrified and heated to contract, the second recovery element 126D made of a general elastic material is elastically stretched under force or the second recovery element 126D made of a SMA is in the power-off state, so that the second SMA element 126C actuates the braking element 128 to rotate towards the movable position. That is, the second SMA element 126C pushes the first protrusion 128B to make the braking element 128 rotate in a direction where it can be separated from the braking end 124C. When the braking element 128 reaches the movable position, the protrusion 122A reaches the second end 128D2 through the neck portion 128D3. When the protrusion 122A is located at the second end 128D2 of the positioning groove 128D, the neck portion 128D3 may engage the protrusion 122A in the second end 128D2 of the positioning groove 128D, so that the braking element 128 is positioned at the movable position.

In this embodiment, when the second recovery element 126D is also a SMA, the width of the neck portion 128D3 is slightly less than the width of the protrusion 122A. Therefore, after the protrusion 122A passes through the neck portion 128D3, it can stay stably at the first end 128D1 or the second end 128D2. In other words, when the second SMA element 126C and the second recovery element 126D made of a SMA are powered off, the protrusion 122A may stay stably at the first end 128D1 or the second end 128D2, and in this way, power consumption is saved and the service life of the second SMA element 126C and the second recovery element 126D is extended.

Next, with reference to FIG. 6, the first SMA element 126A is shortened by being electrified and heated, and then the sliding block 124 is driven away from the position shown in FIG. 5. During the movement of the sliding block 124, the focus ring 112A of the zoom lens group 112 is also rotated, so that the lens 112B corresponding to the focus ring 112A is moved. The timing of stopping the movement of the sliding block 124 is determined, for example, by the user according to the clarity of the image viewed by the user. The user may also control the sliding block 124 to move forwards or backwards, so as to find the state where the clearest image can be seen. Alternatively, regarding the timing of stopping the movement of the sliding block 124, the user may directly input the degree of myopia, and the head-mounted display device 100 directly controls the sliding block 124 to stop at a position corresponding to the degree of myopia inputted by the user. In this embodiment, each of the adjustment modules 120 may further include a position sensor 129 (shown in FIG. 7) assembled to the base 122 for sensing a position of the sliding block 124. Therefore, the head-mounted display device 100 may sense whether the sliding block 124 is moved to a position and stop it at the position. For instance, the position sensor 129 may be a variable resistor, an optical sensor, or a Hall sensor.

With reference to FIG. 10, when zooming is completed, for example, the second SMA element 126C is powered off, the second recovery element 126D made of a general elastic material contracts due to its elastic recovery force or the second recovery element 126D made of a SMA contracts after being electrified and heated, the braking element 128 is actuated to rotate towards the braking position. That is, the second recovery element 126D may push the second protrusion 128C to rotate the braking element 128 towards the direction to be engaged with the braking end 124C until the braking element 128 is engaged with the braking end 124C. Herein, the sliding block 124 cannot move. Therefore, the position of the lens 112B (shown in FIG. 5) corresponding to the focus ring 112A of the zoom lens group 112 is fixed, and the user can stably see a clear image. In other words, in this embodiment, at the braking position, the first SMA element 126A and the second SMA element 126C may be powered off, so that power consumption is saved, and the service life is prolonged.

In an embodiment, the user directly inputs the degree of myopia, and the head-mounted display device 100 directly controls the movement of the sliding block 124. If the position sensor 129 detects that the sliding block 124 reaches the target position, the second SMA element 126C is powered off, so that the second recovery element 126D actuates the braking element 128 to rotate towards the braking position, and the entire operation is completed.

In view of the foregoing, in the head-mounted display device and the adjustment module provided by the invention, the user can electrically control the first SMA element to zoom the zoom lens group and can also electrically control the second SMA element to allow zooming or prohibit zooming. In this way, the convenience of use can be improved, and a precise zooming effect can also be obtained.

What is claimed is:

1. A head-mounted display device, comprising: a body having two zoom lens groups corresponding to both eyes; and two adjustment modules configured to be assembled to the two zoom lens groups, wherein each of the two adjustment modules comprises: a base; a sliding block having an actuating end, a braking end, and a transmission end; a first shape memory alloy element connected between the base and the actuating end and configured to actuate the sliding block so that the transmission end drives the corresponding zoom lens group of the two lens groups to zoom; a first recovery element connected between the base and the actuating end and configured to keep the sliding block at an original position when the first shape memory alloy element is in a power-off state; a braking element engaged with the braking end when the braking element is in a braking position and separated from the braking end when the braking element is in a movable position; a second shape memory alloy element connected between the base and the braking element and configured to actuate the braking element to move between the braking position and the movable position; and a second recovery element connected between the base and the braking element and configured to keep the braking element at the braking position or the movable position when the second shape memory alloy element is in the power-off state.

2. The head-mounted display device according to claim 1, wherein the first shape memory alloy element and the first recovery element are located at two opposite sides of the actuating end.

3. The head-mounted display device according to claim 1, wherein the transmission end is in the shape of a rack.

4. The head-mounted display device according to claim 1, wherein each of the two adjustment modules further comprises a position sensor assembled to the base for sensing a position of the sliding block.

5. The head-mounted display device according to claim 1, wherein the braking element has a pivot end, a first protrusion, and a second protrusion, the second shape memory alloy element is connected between the base and the first protrusion, the second recovery element is connected between the base and the second protrusion, the second shape memory alloy element contracts after being electrified and heated to actuate the braking element to rotate towards the movable position, and the second recovery element contracts to actuate the braking element to rotate towards the braking position after the second shape memory alloy element is powered off.

6. The head-mounted display device according to claim 1, wherein each of the second shape memory alloy element and the second recovery element is in the shape of a straight line.

7. The head-mounted display device according to claim 1, wherein a material of the second recovery element is a shape memory alloy.

8. The head-mounted display device according to claim 1, wherein the braking element has a positioning groove, the base has a protrusion, the protrusion is located at a first end of the positioning groove when the braking element is located at the braking position, the protrusion is located at a second end of the positioning groove when the braking element is located at the movable position, a neck portion of the positioning groove is located between the first end and the second end, and a width of the neck portion is slightly less than a width of the protrusion.

9. An adjustment module configured to be assembled to a zoom lens group of a head-mounted display device, the adjustment module comprising:
a base;
a sliding block having an actuating end, a braking end, and a transmission end;
a first shape memory alloy element connected between the base and the actuating end and configured to actuate the sliding block so that the transmission end drives the zoom lens group to zoom;
a first recovery element connected between the base and the actuating end and configured to keep the sliding block at an original position when the first shape memory alloy element is in a power-off state;
a braking element engaged with the braking end when the braking element is in a braking position and separated from the braking end when the braking element is in a movable position;
a second shape memory alloy element connected between the base and the braking element and configured to actuate the braking element to move between the braking position and the movable position; and
a second recovery element connected between the base and the braking element and configured to keep the braking element at the braking position or the movable position when the second shape memory alloy element is in the power-off state.

10. The adjustment module according to claim 9, wherein the first shape memory alloy element and the first recovery element are located at two opposite sides of the actuating end.

11. The adjustment module according to claim 9, wherein the transmission end is in the shape of a rack.

12. The adjustment module according to claim 9, further comprising a position sensor assembled to the base for sensing a position of the sliding block.

13. The adjustment module according to claim 9, wherein the braking element has a pivot end, a first protrusion, and a second protrusion, the second shape memory alloy element is connected between the base and the first protrusion, the second recovery element is connected between the base and the second protrusion, the second shape memory alloy element contracts after being electrified and heated to actuate the braking element to rotate towards the movable position, and the second recovery element contracts to actuate the braking element to rotate towards the braking position after the second shape memory alloy element is powered off.

14. The adjustment module according to claim 9, wherein each of the second shape memory alloy element and the second recovery element is in the shape of a straight line.

15. The adjustment module according to claim 9, wherein a material of the second recovery element is a shape memory alloy.

16. The adjustment module according to claim 9, wherein the braking element has a positioning groove, the base has a protrusion, the protrusion is located at a first end of the positioning groove when the braking element is located at the braking position, the protrusion is located at a second end of the positioning groove when the braking element is located at the movable position, a neck portion of the positioning groove is located between the first end and the second end, and a width of the neck portion is slightly less than a width of the protrusion.

* * * * *